United States Patent [19]

Suzuki et al.

[11] Patent Number: 4,832,435
[45] Date of Patent: May 23, 1989

[54] POSITIONING MECHANISM OF OPTICAL FIBER CONNECTOR

[75] Inventors: Norio Suzuki, Yokohama; Takayuki Masuko, Koganei; Kaoru Moriya, Yokohama, all of Japan

[73] Assignee: Fujitsu Limited, Kawasaki, Japan

[21] Appl. No.: 80,103

[22] Filed: Jul. 31, 1987

[30] Foreign Application Priority Data

Aug. 8, 1986 [JP] Japan .................. 61-185248

[51] Int. Cl.$^4$ .......................................... G02B 6/36
[52] U.S. Cl. ............................ 350/96.20; 350/96.21
[58] Field of Search ............. 350/96.20, 96.21, 96.22

[56] References Cited

U.S. PATENT DOCUMENTS

| 3,958,114 | 5/1976 | Codrino ................. 350/96.20 |
| 4,541,685 | 9/1985 | Anderson ............... 350/96.20 |
| 4,682,847 | 7/1987 | Moore et al. .......... 350/96.20 |
| 4,711,520 | 12/1987 | Bernardini ............ 350/96.20 |

Primary Examiner—William L. Sikes
Assistant Examiner—Akm E. Ullah
Attorney, Agent, or Firm—Staas & Halsey

[57] ABSTRACT

An optical fiber connector structure for minimizing loss in an optical fiber connector. The connector includes cylindrical member for housing ferrule, a C-ring having a pawl positioned about the cylindrical member, and grooves formed in the cylindrical member for engaging the pawl so that the plug can engage the adapter so as to minimize loss in the connection with minimal amount of adjustment.

7 Claims, 2 Drawing Sheets

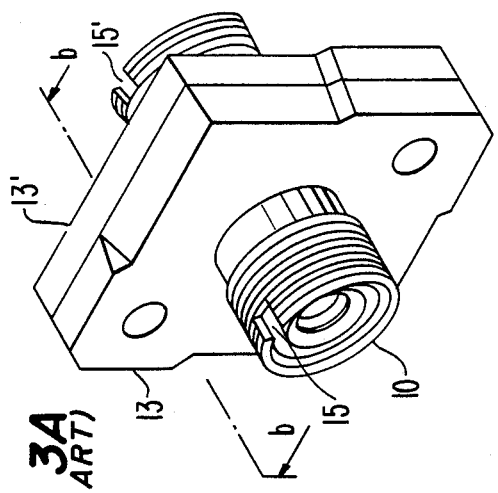
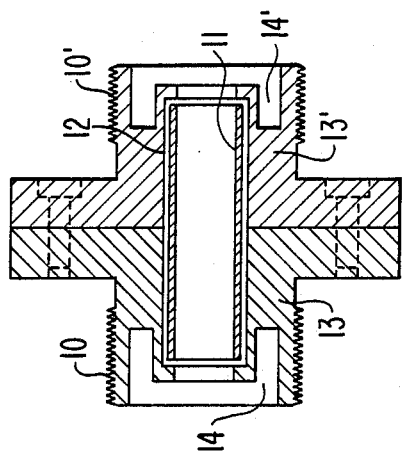
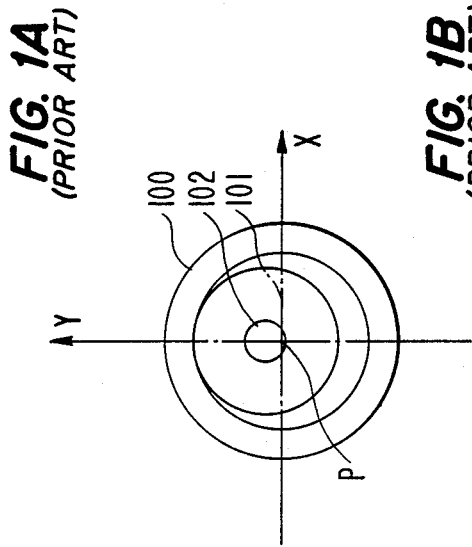
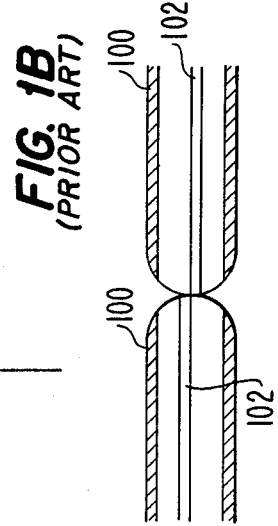
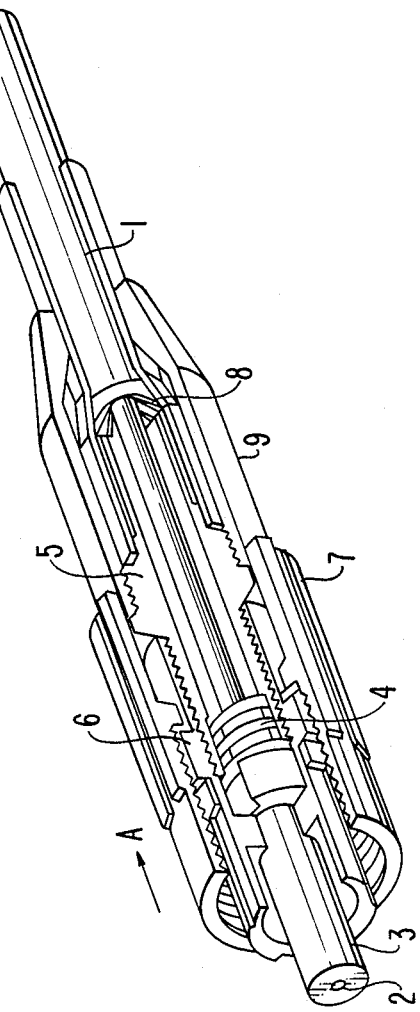

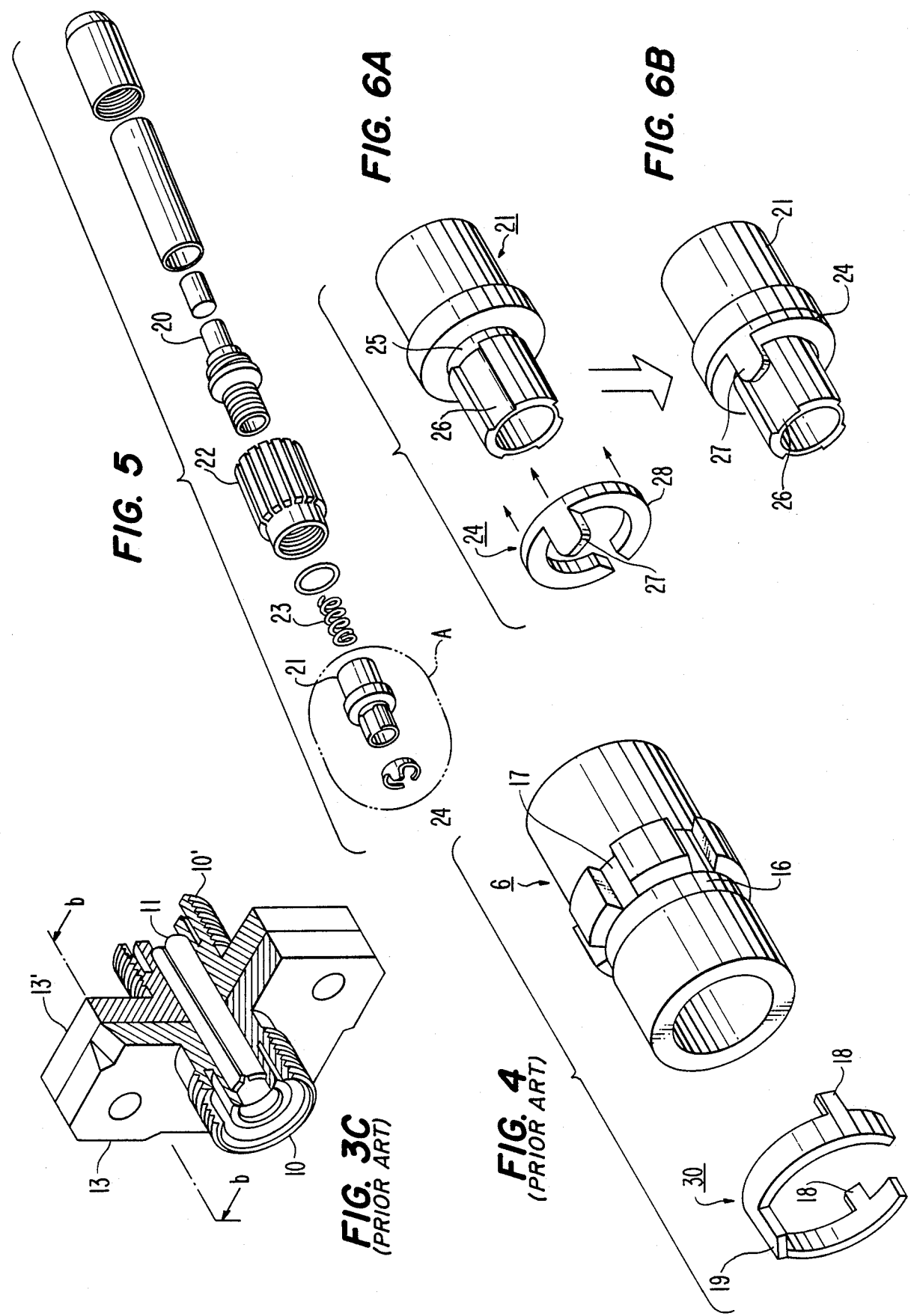

POSITIONING MECHANISM OF OPTICAL FIBER CONNECTOR

BACKGROUND OF THE INVENTION

The present invention relates to an optical fiber connector used for connection of optical fibers; and more specifically to a positioning mechanism for matching deviating direction, in the ferrules of optical fibers to be connected, so as to reduce optical coupling loss due to deviation of optical fibers being fixed to the ferrules.

An optical fiber is generally inserted into a ferrule and is fixed therein with a bonding agent such as epoxy resin. FIG. 1A illustrates an enlarged end face of a ferrule, the diameter of ferrul 100 is larger than the optical fiber diameter (102 is core, 101 is clad). Therefore, it is difficult to accurately position the optical fiber in the center P of ferrule 100. As a consequence, it is inevitably fixed in the ferrule 100 with a deviation from the center P of ferrule 100.

Accordingly, in the case of an optical fiber connector where the optical fibers are optically coupled by polishing the end faces of ferrules in a spherical form and then arranging them to abut each other, if the end faces of ferrules are only arranged to abut each other, the cores 102 will not be aligned. This misalignment (such as shown in FIG. 1B) increases the loss in an optical connector.

This problem can be solved by detecting the deviation direction (e.g., the Y direction in FIG. 1A) of the optical fiber core 102 and matching the deviation direction of the optical fiber core 102 in respective ferrules.

Referring to FIG. 1B, optical coupling efficiency can be improved by causing the optical fibers in the right and left ferrules to abut each other in such a manner that the right or left ferrule is rotated 180 degrees.

For this reason, an optical connector positioning mechanism is used so as to cause the deviating direction of cores of the optical fibers in the respective ferrules to be aligned. Such mechanism is explained with reference to FIGS. 2, 3, and 4.

FIGS. 3A, B, C illustrate a conventional optical connector adapter. In this adapter, an elastic sleeve 11 holds the respective ferrules and is floatingly supported within a cylindrical hole 12 by a pair of housings with flanges 13, 13' which are provided with the threadings 10, 10'. These threadings respectively engage a coupling nut 7 (FIG. 2) of a plug. The ferrule 3 of the plug is inserted into the elastic sleeve 11. The end part of a cylindrical material 6 holds the ferrule 3 and fits in a recessed part 14, 14' (FIG. 3B) of the flanges 13, 13'. When the plugs are inserted into the adapters 13, 13' and the respective coupling nuts 7 on the plugs are engaged with the threadings 10, 10' of the adapters 13, 13', the end faces of ferrules 3 are arranged to abut each other and to be fixed within the elastic sleeve 11. A specified pressing force is applied by a spring. 4.

FIG. 2 is a partial cut-away perspective view illustrating a conventional plug of an optical connector. In this plug, the ferrule 3 holds an optical fiber 2, which extends from the optical fiber cord 1 and is held, together with a pressing spring 4, by a plug body 5 and a cylindrical member 6 which threadingly engages the plug body. The ferrule is coupled to the adapter shown in FIG. 3 with the coupling nut 7. The ferrule 3 is mounted loosely in the axial direction of the cylindrical member 6 but is fixed in the rotating direction.

Referring to FIG. 4, in the ferrule positioning structure, the cylindrical member 6, which holds the ferrule, has a groove 16 formed in the circumferential direction and a plurality of grooves 17 in the axial direction extending from groove 16 toward the rear of the cylindrical member 6. A C-ring 30 has pawls 18 which engage the grooves 17, and a positioning pawl 19 for positioning within the adapter shown in FIGS. 3A–3C. The C-ring 30 engages the circumferential groove 16 of said cylindrical member 6. The position of pawl 19 can be adjusted by adequate engagement of pawls 18 with the grooves 17.

The positioning pawl 19 engages the positioning grooves 15, 15' (FIG. 3A) of the adapters 13, 13'. In this structure, a pair of ferrules is arranged to abutting. However, the optical fiber cores are made to deviate in the same direction by adjusting the deviation direction of the optical fiber cores so that they match. The position of the positioning pawl 19 with respect to the deviation direction can be adjusted as follows. Namely, a reference plug in which the deviating direction of the optical fiber core is known is inserted into one side of an adapter and the plug to be adjusted is inserted into the other side of the adapter. Thereafter engagement of pawls 18 within grooves 17 is determined by rotating the C-ring 30 so that the attenuation loss of optical signal is minimized. Because the coupling condition between the positioning pawl 19 and adapter positioning groove 15 is fixed the optical fiber cores in the ferrules will always deviate in the direction set as a result of the above adjustment.

However, the positioning mechanism of the conventional optical fiber connector has following disadvantage. Adjustment (rotation of the C-ring 30) is carried out after shifting the coupling nut 7 in the direction of arrow A in FIG. 2. But, in this case the pawls 18 are hidden by the coupling nut 7. Because the amount that the coupling nut 7 can be shifted is limited, operation of the coupler is difficult and awkward and pawls 18 may be deformed due to excessive force being applied to the pawls 18 during such operation.

SUMMARY OF THE INVENTION

It is an object of the present invention to provide a positioning mechanism for an optical fiber connector which provides easy adjustment and positioning of the optical fiber, and which assures excellent operability.

A preferred embodiment of the present invention includes an optical fiber connector which couples a plug and an adapter, the plug having a ferrule fixed to an optical fiber therein. The embodiment realizes optical connection by arranging the end faces of abutting optical fibers abut each other and comprises:

a cylindrical member having a plurality of grooves in the axial direction at the surface, for holding said ferrule, a C-ring having a pawl, fixed to said cylindrical member through engagement with any one of said grooves, and a positioning groove, provided in said adapter for engaging with said pawl so that said plug can be perfectly inserted to said adapter.

BRIEF DESCRIPTION OF THE DRAWINGS

FIG. 1A is an enlarged view of an end face of a ferrule;

FIG. 1B is a cross-sectional view of optical fibers illustrating optical fiber alignment deviation;

FIG. 2 is a partial cut-away perspective view of an optical connector plug;

FIG. 3A is a perspective view of an optical connector adapter;

FIG. 3B is a cross-sectional view of the FIG. 3A optical connector adapter along the line b—b;

FIG. 3C is a partial cut-away perspective view of the optical connector adapter of FIG. 3A;

FIG. 4 is a perspective view of an optical connector plug positioning mechanism;

FIG. 5 is a disassembled perspective view of an optical connector plug of the present invention; and FIGS. 6A and 6B are enlarged perspective views of the part A of FIG. 5.

In the drawings, like elements are identified with like symbols.

DETAILED DESCRIPTION OF THE PREFERRED EMBODIMENTS

As indicated in FIG. 5, an optical connector plug comprises a plug body 20, a cylindrical member 21 which holds a ferrule for fixing the position of an optical fiber therein, a coupling nut 22, a spring 23 and a C-ring 24 which is used for positioning the optical fiber as explained with reference to FIG. 3. More particularly, the present invention includes the cylindrical member 21 which is provided with a circumferential groove 25 as shown in FIG. 6A. A ring part 28 of a C-ring 24 is provided with a pawl 27 which engages axial grooves 26 as shown in FIG. 6B. In the preferred embodiment of the present invention the ring part 28 of C-ring 24 engages the circumferential groove 25 of the cylindrical member 21 and simultaneously is capable of engaging one of the axial grooves 26 by way of pawl 27. Thus, the best optical coupling can be attained between optical fibers by matching the deviation directions of their respective cores by connecting the pawl 27 with one of the positioning grooves 15, 15' of the adapters 13, 13'. In this case, engagement or disengagement of pawl 27 with the grooves 26 can be realized very easily without interference with the coupling nut 22. This is because only one pawl is used and operation can be performed from the front of the coupler and plug.

The holding force of pawl 27 within the grooves 26 can be increased by making the depth of the grooves 26 deeper than that of the circumferential groove 25, and also by varying the step between the pawl 27 and the ring part 28 in correspondence with the difference between the depth of the grooves 26 and that of the groove 25.

In FIG. 6, three grooves 26 are formed in the axial direction, but there can be any number of these grooves. Moreover, if the circumferential groove 25 is not provided, the pawl 27 may be fixed relative to the cylindrical member 21 using an elastic force of the C-ring 24.

What is claimed is:

1. An optical fiber connector for connecting a plug having an optical fiber fixed in a ferrule, with an adapter so as to minimize loss in the optical connection said connector comprising:

A cylindrical member, having a longitudinal axis, for housing the ferrule;

A C-ring having a pawl and being positioned about said cylindrical member;

groove means, formed in said cylindrical member, for engaging said pawl so that the plug engages the adapter and said pawl to minimize loss in said optical connection.

2. An optical fiber connector according to claim 1, wherein said groove means includes a circumferential groove formed in said cylindrical member and wherein said C-ring engages said circumferential groove.

3. An optical fiber connector according to claim 2, wherein said groove means further includes longitudinal grooves along the longitudinal axis of the cylindrical member.

4. An optical fiber connector according to claim 3, wherein said longitudinal grooves extend from said circumferential groove to an end part of said cylindrical member.

5. An optical fiber connector according to claim 4, wherein said C-ring has inner and outer radii and said pawl is radially positioned on said C-ring and is shifted radially from said inner radius.

6. An optical fiber connector according to claim 1, wherein said groove means includes longitudinal grooves along the longitudinal axis of the cylindrical member.

7. An optical fiber connector according to claim 6, wherein said C-ring has inner and outer radii and said pawl is radially positioned on said C-ring and is shifted radially fro said inner radius.

* * * * *